United States Patent
Hara et al.

(10) Patent No.: US 6,349,305 B1
(45) Date of Patent: Feb. 19, 2002

(54) METHOD AND SYSTEM FOR DATABASE PROCESSING BY INVOKING A FUNCTION RELATED TO INDEX TYPE DEFINITION, GENERATING AN EXECUTION PLAN BASED ON INDEX TYPE NAME

(75) Inventors: Norihiro Hara, Kawasaki; Nobuo Kawamura, Atsugi; Shunichi Torii, Musashino; Yoshito Kamegi, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/715,120

(22) Filed: Nov. 20, 2000

Related U.S. Application Data

(63) Continuation of application No. 09/028,056, filed on Feb. 23, 1998.

(30) Foreign Application Priority Data

Feb. 26, 1997 (JP) .............................................. 9-041906

(51) Int. Cl.[7] .............................................. G06F 17/30
(52) U.S. Cl. .............................. 707/102; 707/2; 707/4; 707/100; 707/103
(58) Field of Search ............... 707/1–8, 10, 100–104.1; 709/328, 315–316

(56) References Cited

U.S. PATENT DOCUMENTS

| | | | | |
|---|---|---|---|---|
| 4,961,139 A | * | 10/1990 | Hong et al. ..................... | 707/1 |
| 5,295,256 A | | 3/1994 | Bapat ............................. | 717/5 |
| 5,404,510 A | * | 4/1995 | Smith et al. .................... | 707/2 |
| 5,418,961 A | * | 5/1995 | Segal et al. ..................... | 707/1 |
| 5,560,007 A | | 9/1996 | Thai ............................... | 707/3 |
| 5,615,367 A | | 3/1997 | Bennett et al. ............. | 707/102 |
| 5,689,633 A | | 11/1997 | Cotner et al. ................. | 714/16 |
| 5,758,144 A | * | 5/1998 | Eberhard et al. .............. | 707/2 |
| 5,765,147 A | * | 6/1998 | Mattos et al. ................... | 707/4 |
| 5,799,310 A | | 8/1998 | Anderson et al. ........... | 707/102 |
| 5,806,058 A | * | 9/1998 | Mori et al. ..................... | 707/2 |
| 5,842,196 A | * | 11/1998 | Agarwal et al. ................ | 707/2 |
| 5,875,334 A | | 2/1999 | Chow et al. .................... | 717/5 |
| 5,893,104 A | * | 4/1999 | Srinivasan et al. ......... | 707/102 |
| 6,061,690 A | * | 5/2000 | Nori et al. ................... | 707/103 |
| 6,112,198 A | * | 8/2000 | Lohman et al. ................ | 707/3 |
| 6,115,704 A | * | 9/2000 | Olson et al. .................... | 707/3 |
| 6,128,610 A | * | 10/2000 | Srinivasan et al. ............ | 707/3 |

(List continued on next page.)

OTHER PUBLICATIONS

Database Language SQL, SQL3–A Tutorial, Jim Malton, Sybase, Inc. 1996.

SIGMOD Record, vol. 23, No. 4, Dec. 1994, "Recent Design Trade–offs in SQL3", N. Mattos et al, pp. 84–89.

*Primary Examiner*—Jack Choules
*Assistant Examiner*—Srirama Channavajjala
(74) *Attorney, Agent, or Firm*—Mattingly, Stanger & Malur

(57) ABSTRACT

A method and a system for executing a general database processing independent of a specific user-defined function are provided. In an implementation method, index definition information for setting a specific user-defined function in correspondence to a specific index which is used to carry out an index access to data in a database region is created, and module definition information for setting the specific index which is used to carry out the index access to the data in the database region in correspondence to an implementation module for subjecting the data in the database region to a specific processing is created. When it is determined in response to a processing request for the database issued from an end user, that the user-defined function contained therein is set in correspondence to the specific index on the basis of the index definition information, a specific implementation module for carrying out an access using the specific index is selected from the module definition information, and a database processing is performed using the implementation module thus selected.

6 Claims, 9 Drawing Sheets

U.S. PATENT DOCUMENTS 6,219,662 B1 * 4/2001 Fuh et al. .................. 707/3
6,240,407 B1 * 5/2001 Chang et al. ............... 707/2
6,253,196 B1 * 6/2001 Fuh et al. .................. 707/3
6,266,663 B1 * 7/2001 Fuh et al. .................. 707/4
6,278,994 B1 * 8/2001 Fuh et al. .................. 707/4
6,279,004 B1 * 8/2001 Lee et al. ................. 707/100

* cited by examiner

FIG. 4

INDEX TYPE INFORMATION 51a

| INDEX TYPE NAME | INDEX TYPE ID | NUMBER OF INDEX KEYS | |
|---|---|---|---|
| DOC-INDEX | 890 | 1 | ~511 |
| XYZ-INDEX | 235 | 2 | ~511 |
| ... | ... | ... | ~511 |

INDEX KEY INFORMATION 51b

| INDEX TYPE ID | DATA TYPE | DEFINITION LENGTH | SPECIFIED NUMBER | |
|---|---|---|---|---|
| 890 | VARCHAR | 32000 | 1 | ~512 |
| 235 | INT | 4 | 1 | ~512 |
| 235 | CHAR | 256 | 2 | ~512 |
| ... | ... | ... | ... | ~512 |

FIG. 5

INDEX DEFINITION INFORMATION  52a

| INDEX NAME | INDEX ID | NUMBER OF DATA FOR KEY CREATION | INDEX TYPE ID | |
|---|---|---|---|---|
| DOC-SEARCH | 5001 | 1 | 890 | ~521 |
| ... | ... | ... | ... | ~521 |

DATA INFORMATION FOR INDEX KEY CREATION  52b

| INDEX ID | SPECIFIED NUMBER | TABLE NAME | COLUMN NAME | ATTRIBUTE NAME / FUNCTION NAME | |
|---|---|---|---|---|---|
| 5001 | 1 | movies_lib | guide | contents | ~522 |
| ... | ... | ... | ... | ... | ~522 |

ADT FUNCTION INFORMATION FOR INDEX ACCESS  52c

| INDEX ID | ADT FUNCTION NAME | |
|---|---|---|
| 5001 | CONTAINS | ~523 |
| ... | ... | ~523 |

FIG. 6

INDEX MODULE DEFINITION INFORMATION  54a

| MODULE NAME | INDEX TYPE ID | MODULE CALLING TRIGGER | |
|---|---|---|---|
| _p_doc_insert | 890 | AS_INDEX_INSERT | ~541 |
| _p_doc_delete | 890 | AS_INDEX_DELETE | ~541 |
| _p_doc_update | 890 | AS_INDEX_UPDATE | ~541 |
| _p_doc_scan | 890 | AS_INDEX_SCAN | ~541 |
| ... | ... | ... | ~541 |

ADT MODULE DEFINITION INFORMATION  54b

| MODULE NAME | ADT NAME | MODULE CALLING TRIGGER | EXECUTED ADT FUNCTION NAME | INDEX TYPE ID | |
|---|---|---|---|---|---|
| _p_text_contains | TEXT | AS_FUNCTION | CONTAINS | – | ~542 |
| _p_text_keycreate | TEXT | AS_KEY_CREATION | – | 890 | ~542 |
| _p_text_insert | TEXT | AS_INSERT_TRIGGER | – | – | ~542 |
| _p_text_delete | TEXT | AS_DELETE_TRIGGER | – | – | ~542 |
| ... | ... | ... | ... | ... | ~542 |

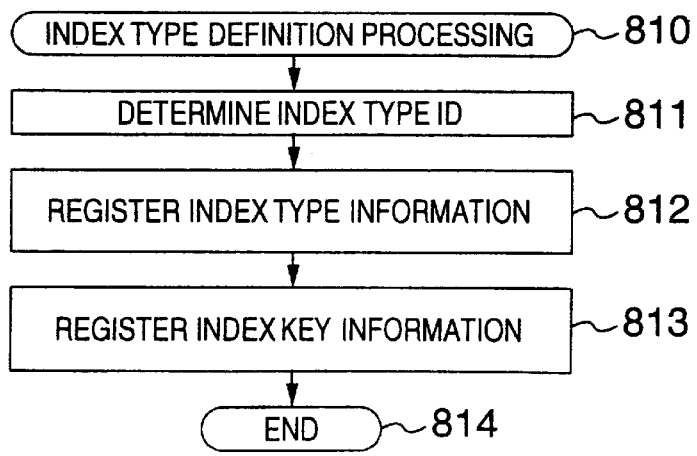

FIG. 7

METHOD AND SYSTEM FOR DATABASE PROCESSING BY INVOKING A FUNCTION RELATED TO INDEX TYPE DEFINITION, GENERATING AN EXECUTION PLAN BASED ON INDEX TYPE NAME

CROSS-REFERENCE TO RELATED APPLICATIONS

This is a continuation application of U.S. Ser. No. 09/028,056, filed Feb. 23, 1998.

This application relates to prior U.S. application Ser. No. 08/917,711 filed on Aug. 26, 1997, now U.S. Pat. No. 5,930,800 assigned to the present assignee, the disclosure of which is incorporated herein by reference.

BACKGROUND OF THE INVENTION

The present invention relates in general to a database processing method and a system for processing a database, and more particularly to a database processing method and a system in which an index access is carried out using a user definition function by which a data type and its behavior can be defined by a user.

Currently, in a database language SQL, the standardization of an SQL3 (ISO, ANSI) has been promoted. As one of the primary functions of the SQL3, there is an ADT (Abstract Data Type).

By the ADT is meant a data type to be defined by some user definition wherein the object-oriented concept is introduced thereinto, and the operation for the ADT data is defined in the form of a method (a function or a procedure) by a user. If the ADT is employed, then it is possible to implement the complicated data structure as data in the database. In addition, the behavior (accompanying function) of the ADT data can be defined in the form of an ADT function.

In the definition of the ADT, both the specification of the attributes used to express the ADT value, and the specification of the ADT functions used to implement the behavior thereof, are defined. The ADT definition information is, similarly to table definition information and the like, managed as the dictionary information in a database management system in many cases.

For the definition of the ADT function, it is also possible to specify a module which is described with a general programming language such as an SQL itself or a C language to be compiled in order to be registered in a system. The relation between the program module used to implement the ADT function and the ADT function is described in an ADT definition statement for defining the ADT (e.g., a CREATE TYPE statement in the SQL).

The use of the ADT results in the function coping with the multimedia data being able to be implemented in the form of a function of the database management system. This means that the processing which has been conventionally executed with an application program can be implemented in the database system at a high speed and with a low development cost.

On the other hand, in a general search system, in order to implement a certain special function at a high speed, the access method unique to that function is utilized in many cases. As a typical one, an index is given as an example.

For example, in a full text search system, there is used a dedicated index which is constituted by keywords extracted from the documents for searching some keywords in documents at a high speed, a character component table or the like. In addition, in many database management systems, by using an access method such as a B-tree index self-contained in the system, the promotion of a user query processing, i.e., a retrieval processing has been made.

With respect to the ADT data as well, there can be considered the utilization of a special index for implementing the evaluation peculiar to a certain ADT, i.e., the retrieval evaluation or the high speed evaluation (retrieval evaluation). In order to have sufficiently the benefits of the ADT, however, the means for adding an access method of the user definition, i.e., an index is required for the database management system.

Now, in the conventional database processing method, as for one approach of adding the user-defined index, there is given as an example a method wherein an access method to implement the ADT function at a high speed is contained in the module for implementing the ADT function. In this case, however, since the module for implementing the ADT function has a function of accessing to the user-defined index, the user definition index of interest is fastened to the ADT, and hence will lose the independency for the ADT.

Therefore, in the above-mentioned conventional database processing method, if the function of accessing to the user definition index is self-contained in the ADT function, then, there arises a problem that however usefully and generally the index is designed, that index cannot be utilized from other ADTS.

In addition, it is impossible to support the indexes coping with all the data such as not only the B-tree index, but also the index for text search or the index for image search, within the above-mentioned conventional database management system. Then, there arises another problem that if the indexes coping with many data are supported, then the database management system will become larger in scale, and hence all the worse, the unnecessary index module will be self-contained for some users.

SUMMARY OF THE INVENTION

In the light of the foregoing problems associated with the prior art, it is therefore an object of the present invention to provide a database processing method and a system by which a general database processing can be carried out independent of a specific user-defined function, and a recording medium for implementing the method and the system.

It is another object of the present invention to provide a relational database processing method and a system by which an implementation module for carrying out a specific index access can be made independent of a user-defined function, and a recording medium for implementing the method and the system.

It is still another object of the present invention to provide a relational database processing technology by which only an implementation module required for a database can be self-contained.

The outline of a typical one of the inventions disclosed in the present application will be simply described as follows.

That is, a relational database processing method of executing a function, which is previously defined and registered in a database, in accordance with a processing request to execute a database processing, includes the step of selecting, when a user-defined function in processing request for the database is set in correspondence to a specific index on the basis of the above-mentioned index definition information, a specific implementation module for carrying out an access using the specific index from the module definition information, and the step of executing the database processing using the implementation module thus selected.

As described above, according to the database processing method of the present invention, by preparing the function in which the user-defined function in processing request is defined in the index definition information, the implementation module corresponding to the above-mentioned user-defined function is executed to carry out the index access. As a result, it is possible to execute the database processing by the user-defined index independent of a specific user-defined function.

Other objects, features and advantages of the present invention will become apparent from reading the following description of the embodiments of the invention taken in conjunction with the accompanying drawings.

BRIEF DESCRIPTION OF THE DRAWINGS

FIG. 4 is a view showing an example of a structure of index type definition information 51, which is stored in a dictionary 5, according to an embodiment of the present invention;

FIG. 5 is a view showing an example of a structure of index definition information 52, which is stored in the dictionary 5, according to an embodiment of the present invention;

FIG. 6 is a view showing an example of a structure of module definition information 54, which is stored in the dictionary 5, according to an embodiment of the present invention;

FIG. 7 is a flow chart of a typical flow showing the steps to define a new index type according to an embodiment of the present invention;

DESCRIPTION OF THE PREFERRED EMBODIMENTS

The description will hereinafter be given with respect to, in a database processing method of the present invention, an embodiment according to the present invention wherein a user-defined function which is previously defined and registered with a database is executed in accordance with a processing request to carry out the database processing.

Figure 1:
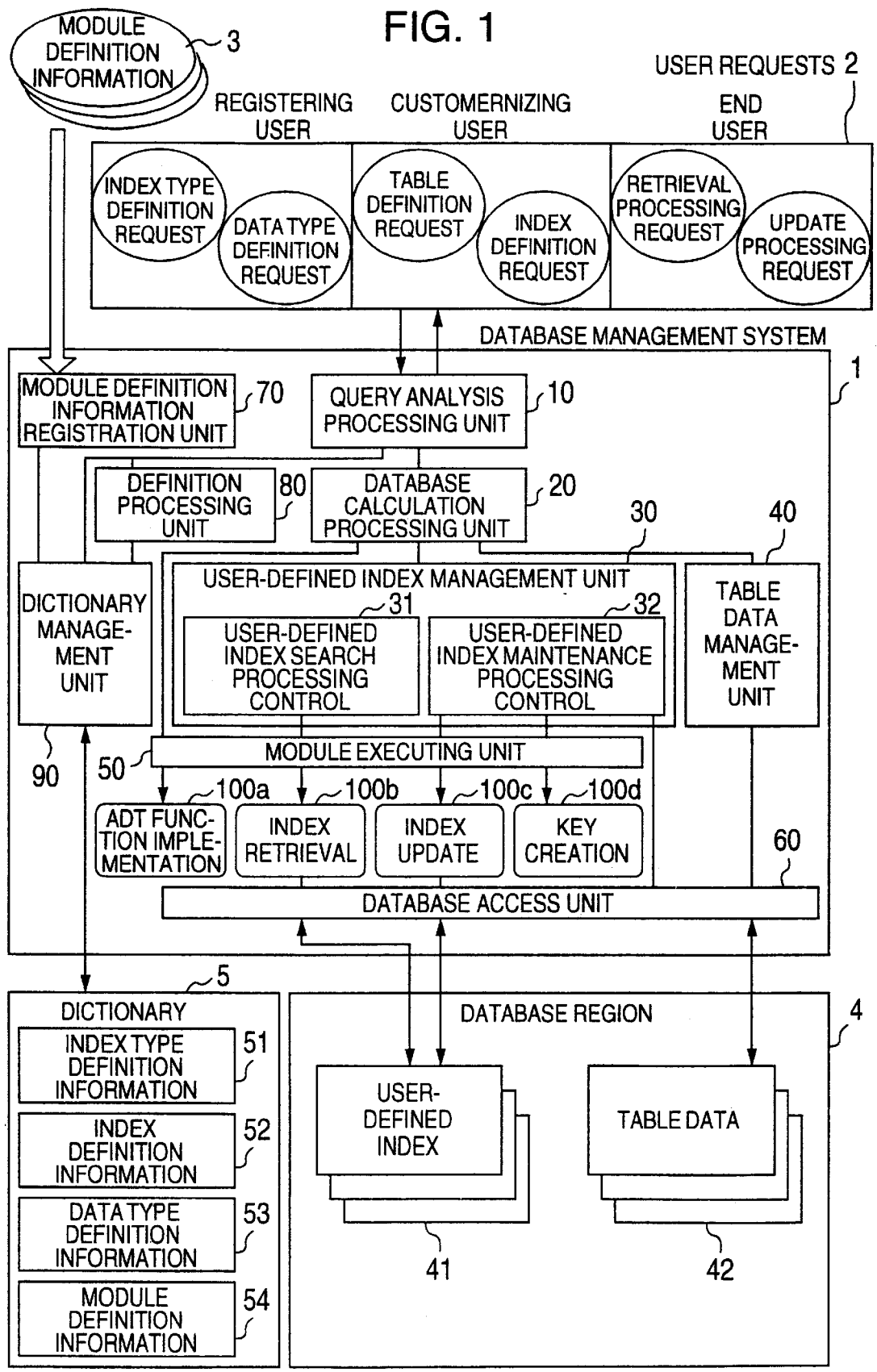
FIG. 1 is a block diagram showing a schematic structure of software for implementing a database processing method according to one embodiment of the present invention.

FIG. 1 shows a schematic structure of a software for implementing a database processing method according to the present embodiment. In FIG. 1, reference numeral 1 designates a database management system; reference numeral 2 designates user requests; reference numeral 3 designates module definition information; reference numeral 4 designates a database region; reference numeral 5 designates a dictionary; reference numeral 10 designates a query analysis processing unit; reference numeral 20 designates a database calculation processing unit; reference numeral 30 designates a user definition index management unit; reference numeral 31 designates a user-defined index search processing control unit; reference numeral 32 designates a user-defined index maintenance processing control unit; reference numeral 40 designates a table data management unit; reference numeral 41, a user-defined index; reference numeral 42, table data; reference numeral 50, a module execution unit; reference numeral 51, index type definition information; reference numeral 52, index definition information; 53, data type definition information; 54, module definition information; 60, a database access unit; 70, a module definition information registration unit; 80, a definition processing unit; 90, a dictionary management unit; and 100a to 100d, various kinds of modules.

As shown in FIG. 1, in the present embodiment, both the registering of the user-defined index 41 and the access thereto are implemented in the following manner. The kind of index which a registering user tries and adds newly to the database management system 1 will hereinbelow be called an index type.

In the present embodiment, the modules used to implement retrieval, update and the like for the index to which a certain index type is applied are registered, as the implementation module of the user-defined function similarly to the ADT, in the database management system 1 by a registering user. As apparent from FIG. 1, the various kinds of modules 100a to 100d shown in the figure are user-defined function implementation modules registered the database management system 1.

First of all, a registering user who tries and adds newly an index to the database management system 1 registers, as the index type definition information 51, the information in which the database management system 1 recognizes the index type of interest to execute the implementation module of the index type of interest, in the database management system 1. In the example shown in FIG. 1, this processing is executed in accordance with an index type definition request contained in user requests of a registering user.

Next, the index of a certain index type is created for one or more data items in the table stored previously in the database, so that in response to a retrieval request issued from an end user, to use the index of interest becomes possible. The instruction of creating the index of interest is issued, similarly to the table definition, to the database management system 1 by a customernizing user. In the example of FIG. 1, this processing is executed in accordance with an index definition request within the user requests 2.

The created index is selected as the most suitable access path in the query analysis processing unit 10 in accordance with the retrieval request issued from an end user. Then, the created index is accessed under the control of the user-defined index management unit 30 to offer higher performance on retrieval.

In the index type definition request, there is contained the information relating to the index type name, the data type of data to maintain the index (hereinafter, referred to as an index key, when applicable) and so on. In the index definition request, there is contained the information relating to an index of which index type should be created, which table data 42 should be required in order to create and maintain the index, which case the use of the index of interest corresponds to, and the like. Both the index type definition information and the index definition request are stored in the dictionary 5 which the dictionary management unit 90 manages at all times.

Next, the database processing according to the present embodiment will hereinbelow be described in detail with reference to FIG. 1.

A system for implementing the database processing method of the present embodiment includes:

the query analysis processing unit 10 for receiving an SQL (Structured Query Language) as a database query request issued from an end user, carrying out an optimization processing by which the most suitable access path for a database access is determined through parsing, and semantic analysis processing, and generating an internal processing code to access the database by the most suitable access path thus determined;

the database calculation processing unit 20 for controlling the database access on the basis of the internal processing code generated by the processing unit 10; the user-defined index management unit 30 for controlling the execution of the module to access the user-defined index 41;

the table data management unit 40 for controlling an access to the table data 42 in accordance with a request instruction issued from the database calculation processing unit 20; the module execution unit 50 for executing the various kinds of modules 100*a* to 100*d* in accordance with a request instruction issued from either the database calculation processing unit 20 or the user-defined index management unit 30;

the database access unit 60 for carrying out an access to the database region 4 in which both the user-defined index 41 and the table data 42 are stored; the module definition information registration unit 70 for receiving and analyzing the module definition information 3 relating to the module for implementing an access to either the ADT function inputted from an end user or the user-defined index 41 to require the registration of the information 3 thus analyzed in the dictionary 5; and the definition processing unit 80 for requiring, when the user request 2 is a request for various kinds of definitions, either the registration or the deletion of the associated information in or from the dictionary 5 on the basis of the analysis result of the query analysis processing unit 10; the dictionary management unit 90 for carrying out either the registration processing, the reference processing or the deletion processing for the associated information in, to or from the dictionary 5.

The definition information relating to the table, the index and the like is stored in the dictionary 5. In the definition information which is stored in the dictionary 5, there are contained the index type definition information 51, the index definition information 52, the data type definition information 53, and the module definition information 54.

In this connection, the index type definition information 51 is information which is inputted in accordance with the index type definition request. Also, the index definition information 52 is information which is inputted in accordance with the index definition request used to create the index.

In addition, the data type definition information 53 is information relating to the ADT, i.e., the information relating to both the data types constituting the new ADT and the ADT functions used to implement the behavior of the ADT data. Some of the ADT functions are implemented by using the user-defined index 41. The data type definition information 53 is information which is inputted from a registering user in accordance with the data type definition request contained in the user request 2.

Also, the module definition information 54 which is inputted from a registering user contains therein information which represents the module calling trigger at which the module used to either implement the ADT function or implement the user-defined index 41 is executed.

As for the registered modules, there are the module to implement the ADT function, the module used to access the user-defined index 41, the module used to maintain (insertion, update and deletion) the user-defined index 41, the module to create the input key for maintaining the user-defined index 41, and the like. The various kinds of modules 100*a* to 100*d* shown in FIG. 1 correspond to those modules, respectively.

Figure 2:
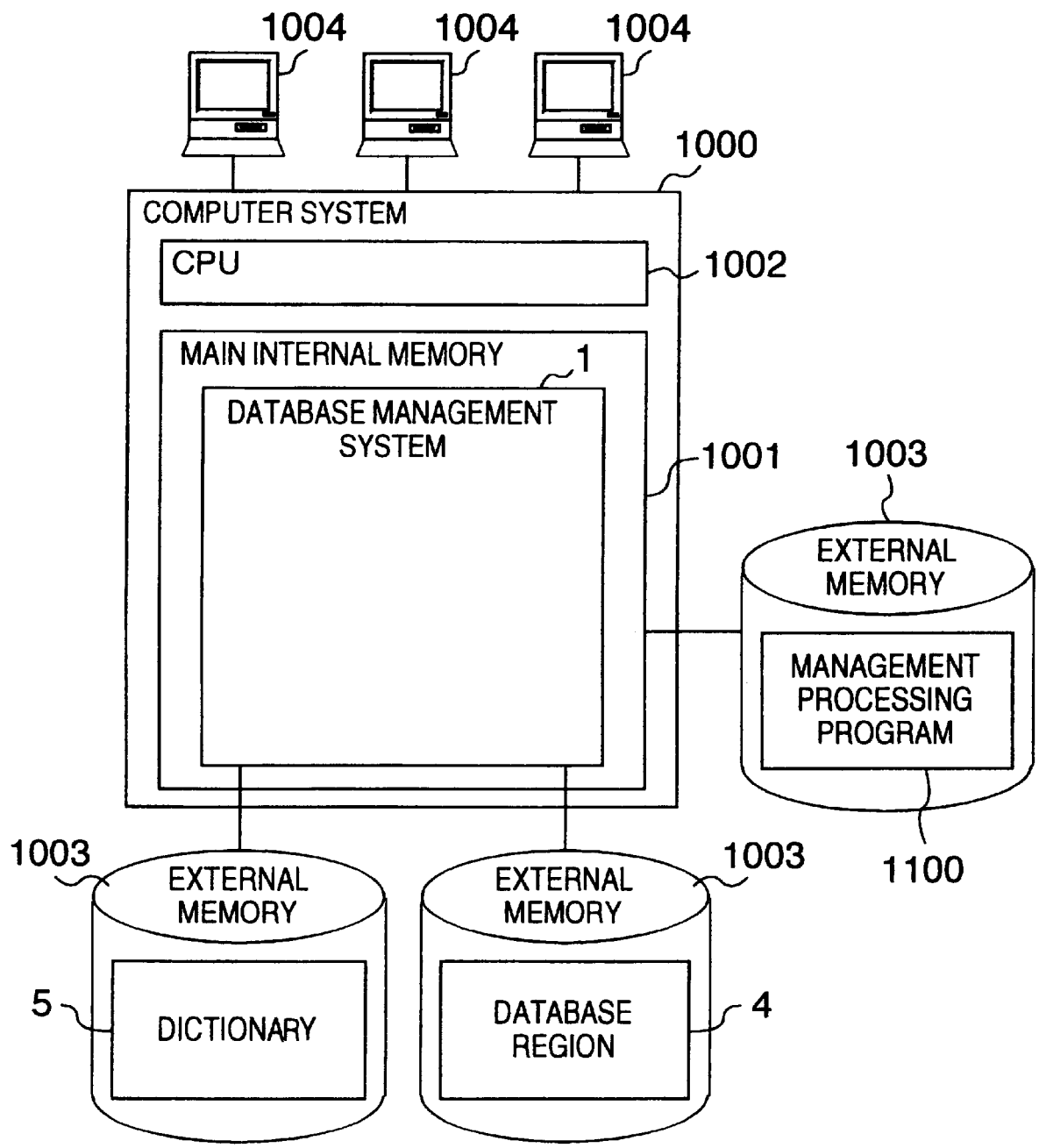
FIG. 2 is a schematic view showing an example of a hardware construction for implementing the database processing method according to an embodiment of the present invention.

FIG. 2 shows an example of a hardware construction of the present embodiment.

In the hardware construction of the present embodiment, as shown in FIG. 2, a computer system 1000 includes a CPU 1002, a main internal memory 1001, external memories 1003 such as magnetic disks, and a large number of terminals 1004.

The database management system 1 which is previously described with reference to FIG. 1 is provided on the main internal memory 1001. Also, in the external memories 1003, there are stored both the dictionary 5 containing therein the various kinds of definition information relating to the database which is managed by the database management system 1, and the database region 4 containing therein both the defined table data 42 and the user-defined index 41. In addition, a processing program 1100 which is used to implement the database management system 1 by the computer system 1000 is also stored in the associated external memory 1003.

Figure 3:
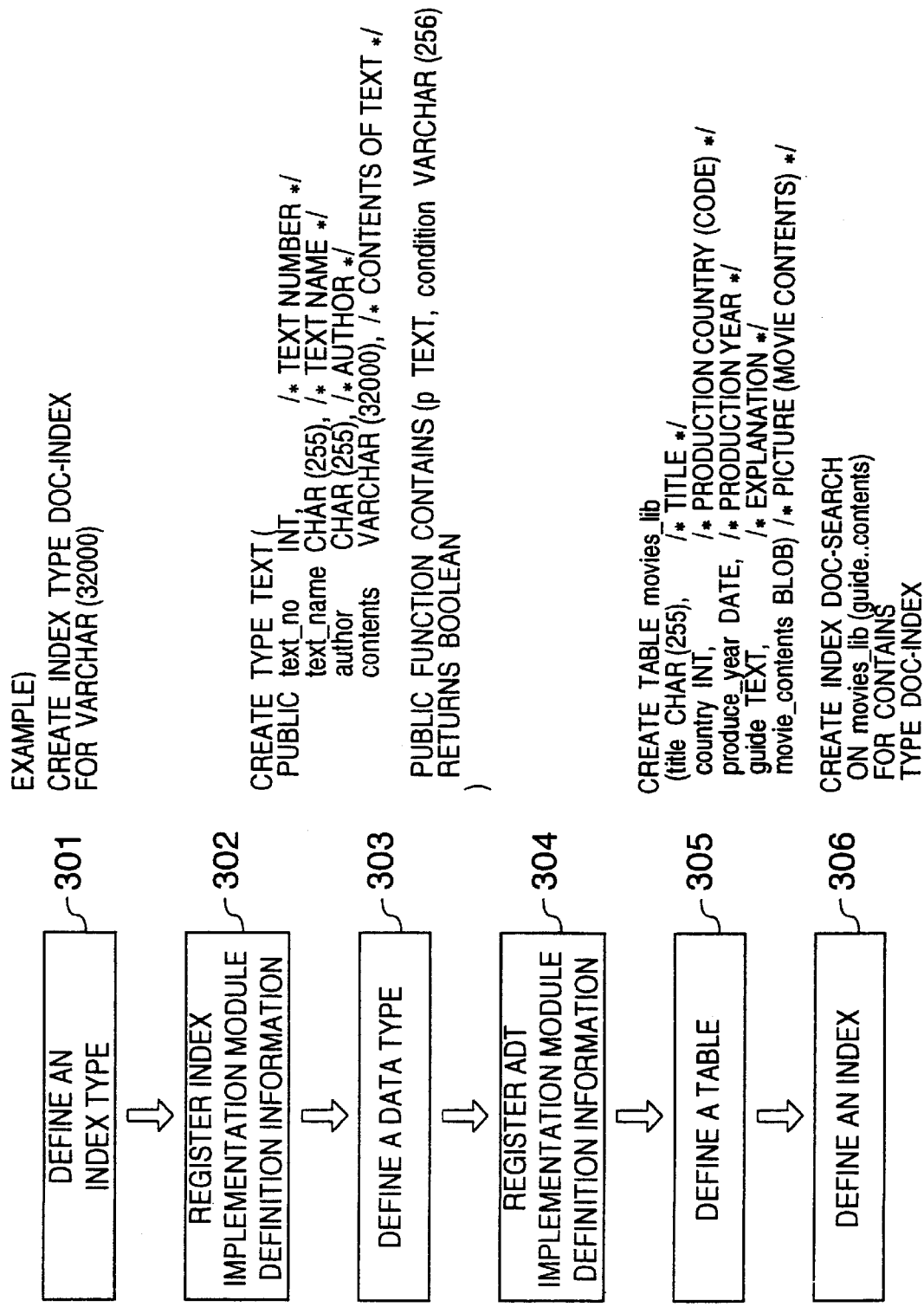
FIG. 3 is a view showing an example of the steps to define a new index type and then to build an index of the index type in the database processing method according to an embodiment of the present invention.

FIG. 3 shows an example of the procedure to define a new index type and then to build an index of the index type of the present embodiment. In FIG. 3, reference numerals 301 to 306 designate processing steps or procedures, respectively.

As shown in FIG. 3, in the steps to define a new index type and to build an index of the present embodiment, there are shown the steps when a registering user adds a new index type for the database management system 1 and the customernizing user builds an index of the index type, and the outline thereof is as follows.

(1) Define an index type (procedure 301).
(2) Register the index implementation module information (procedure 302).
(3) Define a data type (procedure 303).
(4) Register ADT implementation module information (procedure 304).
(5) Define a table (procedure 305).
(6) Define an index (procedure 306).

First of all, in the definition of an index type (procedure 301), the information relating to the index type which is intended to be added is registered in the dictionary 5. In the definition of an index type, a registering user specifies the following two items.

(A) An index type name which is used as an identifier to specify which type the index belongs to when creating the index of interest.

(B) The number of data items of the data, i.e., the index key, which is required as the input for the update processing when updating the index in conjunction with the operation of inserting, updating or deleting the table data 42 and the data types thereof.

As for the interface during the registration, there is considered the syntax becoming close to an SQL format such as "CREATE INDEX TYPE statement" shown in the example of FIG. 3. Hereinbelow, an example of description of the syntax "CREATE INDEX TYPE statement" is shown in an extended version of BNF ("Backus Normal Form" or "Backus Naur Form").

CREATE INDEX TYPE: index-type-name
 [FOR {data-type-name [, data-type-name, . . . ]
  |ADT-name
  |ADT-name WITH attribute-name
  [, attribute-name, . . . ]}
 ]

In the above-mentioned example of the syntax, both the data type of the index key of the item (B) and the number of data items thereof (the number of enumerated data types) are specified in the FOR phrase. In addition, it is indicated that the index key is utilized as the input when updating the data which is of the following types (a) one or more legacy (basic) data types.

(b) The ADT shown by the ADT-name.

(c) The data of one or more attributes out of the ADT data represented by the ADT-name.

The number of data items of the index key of interest is represented by the number of data types or attribute names after the WITH phrase in the above-mentioned example of description of the syntax.

In "CREATE INDEX TYPE statement" shown in FIG. 3, the index type is defined in which the index type name is DOC-INDEX and the index key is only of a VARCHAR type.

Following to procedure 301 for the definition of an index type, the module definition information 54 of the module to implement the above-mentioned index is registered in procedure 302. Hereinbelow, there is given one example of the user interface when registering the module definition information 54 of the index implementation module based on the index type shown in FIG. 3.

udimodule {
 index-type-name: DOC-INDEX
 _p_doc_insert {
  module calling trigger: AS_INDEX_INSERT
 }
 _p_doc_delete {
  module calling trigger: AS_INDEX_DELETE
 }
 _p_doc_update
  module calling trigger: AS_INDEX_UPDATE
 }
 _p_doc_scan {
  module calling trigger: AS_INDEX_SCAN
 }
 }

First of all, udimodule shows that the module definition information which has been inputted by a registering user is the definition information of the module to implement the user-defined index 41. Then, as for the name of the user-defined index type associated therewith, DOC-INDEX is shown in "index-type-name". Subsequently, the information relating to the individual modules is indicated.

The module "_p_doc_insert" shows that it is the module which is executed at a trigger of the index maintenance when inserting the table data, on the basis of the module calling trigger "AS_INDEX_INSERT".

Likewise, the module "_p_doc_delete" shows that it is the module which is executed at a trigger of the index maintenance when deleting the table data, on the basis of the module calling trigger "AS_INDEX_DELETE". Also, the module "_p_doc_update" shows that it is the module which is executed at a trigger of the index maintenance when updating the table data, on the basis of the module calling trigger "AS_INDEX_UPDATE".

In addition, the module "_p_doc_scan" shows that it is the module which, when the retrieval instruction employing the index of the present index type is issued thereto, is executed in order to implement that retrieval.

By completing both the definition of an index type (procedure 301) and the registration of index implementation module definition information (procedure 302) as described above, it becomes possible that the database management system 1 recognizes the module used to implement the index, and also the index of the defined index type is created and used.

Next, the definition of the data type including the ADT function as the interface through which the index of the defined index type is used, is carried out (procedure 303). In this connection, the definition of the data type is carried out in a "CREATE TYPE statement" of the SQL.

In the example of a "CREATE TYPE statement" shown in FIG. 3, there is defined the ADT of a "TEXT" type having both the attributes of the data, i.e., text_no, text_name, author and contents which are respectively of INT, CHAR, CHAR and VARCHA types, and the ADT function CONTAINS which returns the BOOLEAN type.

With respect to the ADT which was defined in procedure 303 of the definition of a data type, the module definition information 54 of the module to implement the ADT is registered in procedure 304. Hereinbelow, there is given an example of the user interface when registering the definition information of the ADT implementation module on the basis of the definition of a data type shown in FIG. 3.

adtmodule {
  ADT name: TEXT
  _p_text_contains {
   module calling trigger: AS_FUNCTION,
   ADT function name: CONTAINS
  }
  _p_text_insert {
   module calling trigger: AS_INSERT_TRIGGER
   ADT function name: NULL
  }
  _p_text_delete {
   module calling trigger: AS_DELETE_TRIGGER
   ADT function name: NULL
  }
  _p_text_key_create {
   module calling trigger: AS_KEY_CREATION
   ADT function name: NULL
   index type name: DOC-INDEX
  }
 }

First of all, adtmodule shows that the module definition information 3 which has been inputted by a registering user is the definition information of the ADT implementation module. Then, as for the name of the ADT associated therewith, TEXT is shown in "ADT name".

The module "_p_text_contains" shows that it is executed in order to implement the ADT function "CONTAINS". "AS_FUNCTION" is specified as a module calling trigger to the module used to implement the ADT function.

The module "_p_text_insert" shows that it is executed when inserting the data of a TEXT type ("AS_INSERT_TRIGGER" shows that a time point of insertion corresponds to a module calling trigger).

In addition, the module "_p_text_delete" shows that it is executed when deleting the table data including the data of a TEXT type ("AS_DELETE_TRIGGER" shows that a time point of deletion corresponds to a module calling trigger).

In addition, the module "_p_text_key create" represented by "AS_KEY_CREATION" shows that it is the module which is executed in order to create an index key during the maintenance of the index of a DOC-INDEX type represented by the index type name.

From the foregoing, the interface which is used to use and maintain the index of the index type of interest is established, and also the decision of use of the index from a user query has been made.

Under the definition of the above-mentioned index type and ADT, a table which will be stored in the database region 4 is defined in the subsequent procedures 305 and 306, and also the user-defined index 41 which is previously defined is created for the table.

The definition of the table is, in the SQL as in the example of procedure 305 of FIG. 3, carried out in "CREATE TABLE statement". In this example, there is defined a movies_lib table which is constituted by columns of the data, i.e., title, country, production_year, guide, and movie_contents which are respectively of CHAR, INT, DATE, TEXT, and BLOB types.

In the definition of an index (procedure 306) in which the creation of the user-defined index 41 is carried out, information relating to the index which is intended to be created is registered. In the definition of an index, the following three items are specified in addition to the index name which is used to recognize an index to be created.

(A) An index type name of an index to be created.

(B) A table name, an attribute name or an ADT function name used to decide the data for use in creation of an input key for index maintenance.

(C) An ADT function name which will be an interface through which the defined index is used.

As for the interface during the above-mentioned creation of an index, there is considered the syntax coming close to the SQL format such as "CREATE INDEX statement" shown in the example of FIG. 3. Hereinbelow, an example of description of the syntax of "CREATE INDEX statement" will be shown in the extended version of the BNF form.

CREATE INDEX table-name
ON {column-name
  |column-name . . . attribute-name
    [, column-name . . . attribute-name . . . ]|column-name
      (ADT function-name
IN ADT-name) }
FOR function-name [, function-name]
TYPE index-type-name In the TYPE phrase, an index of which type of the item (A) should be created is specified. In the ON phrase, which column and attribute of the specified table name of the item (B) should be used in the data for index maintenance is specified. Then, in the FOR phrase, the ADT function is specified which will become the interface through which the user-defined index 41 of the item (C) is used. In the information of the item (B), it is possible to specify a plurality of table data.

In the "CREATE INDEX statement" shown in FIG. 3, there is made the definition of an index in which the added index type is DOC-INDEX, the index name is DOC-SEARCH, and the table data 42 for maintenance is contents attribute in guide column of movies_lib table.

In addition, in the "CREATE INDEX statement", by using the index type definition information of the dictionary 5, it is also possible to check whether or not the index of the specified index type can be properly created for the data type of the table column which is specified below the ON phrase in which the creation of the index is designated.

By executing the above-mentioned procedures, the definition of an index type and the definition (creation) of an index are carried out. In this connection, in the case where the index key constituting the index to which a certain index type is applied specifies certain ADT data, i.e., in the case where both a certain index type and a certain data type are simultaneously registered in the database management system 1, the creation procedures such as the procedure example of FIG. 3 are not carried out, but alternatively (3) the definition of a data type and (4) the registration of ADT implementation module definition information may be carried out before (1) the definition of an index type and (2) the registration of index implementation module definition information.

Next, a description will hereinbelow be given with respect to an example of a structure of the dictionary 5, in which the various kinds of definition information previously shown is stored, in the database processing method of the present embodiment with reference to FIGS. 4, 5 and 6.

FIG. 4 shows an example of a structure of the index type definition information 51 which is stored in the dictionary 5.

As shown in FIG. 4, the index type definition information 51 which is stored in the dictionary 5 of the present embodiment contains therein both index type information 51a and index key information 51b.

The index type information 51a includes index type information entries 511 for the number of user-defined index types, and each of the index type information entries 511 contains therein an index type name, an index type identifier (id) and data relating to the number of index keys.

The index type name shows the name of the index type which is specified by a user on the basis of the definition of an index type, and the index type identifier (id) is the identifier which the database management system 1 assigns to the index type name when defining an index type. Also, the index type identifier (id) is used, instead of the index type name, as the identifier of the index type within the database management system 1.

The number of index keys is the number of index keys which are required for maintaining the index of the index type of interest, and it represents the number of index key data types which are specified in the "CREATE INDEX TYPE statement".

The index key information 51b includes index key information entries 512 for the total sum of the numbers of index keys of the individual index types.

Each of the index key information entries 512 contains therein an index type id showing which index type the index key information 51b relates to, a data type of the index key of interest, a definition length of the index key of interest, and a specified number of the index key of interest. In this connection, the above-mentioned specified number shows the order which is specified in the "CREATE INDEX TYPE statement".

The index type information entries 511 and the index key information entries 512 have a relation of the ratio of one to n (n is the number of index keys) by the index type id.

FIG. 5 diagrammatically shows an example of a structure of the index definition information 52 which is stored in the dictionary 5 of the present embodiment. In FIG. 5, reference numeral 52a designates index definition information, reference numeral 521 designates an index definition information entry, reference numeral 52b designates data information for index key creation, reference numeral 522 designates a data information entry for index key creation, reference numeral 52c designates ADT function information for an index access, and reference numeral 523 designates an ADT function information entry for an index access.

As shown in FIG. 5, as for the index definition information 52 which is stored in the dictionary 5 of the present embodiment, there are three kinds of information, i.e., the index definition information 52a, the data information 52b for index key creation, and the ADT function information 52c for index access.

The index definition information 52a includes index definition information entries 521 for the number of created indexes, and each of the index definition information entries 521 contains therein an index name, an index id, data relating to the number of data for key creation, and an index type id.

The index name represents the name of the index which is specified from a user on the basis of the definition of an index, and the index id represents the identifier which the database management system 1 assigns to the index name when defining the index. The index id is used, instead of the index name, as the identifier of the index within the database management system 1.

By the number of data for key creation is meant the number of items of the table data 42 which is required for maintaining the index which is specified in "CREATE INDEX statement". Then, the index type id shows the type of the index of interest.

The data information 52b for index key creation is the information relating to the table data 42 used to create an index key. In accordance with this information, the required table data 42 is obtained. The data information 52b for index key creation includes data information entries 522 for index key creation for the total sum of the numbers of data used to create the keys of the individual indexes.

Each of the data information entries 522 for index key creation contains therein an index id showing which index the data information 52b for index key creation relates to, a specified number, a table name, a column name, and an attribute name or a function name. In this connection, the specified number represents the order which is specified in the "CREATE INDEX statement".

The ADT function information 52c for an index access is the information relating to the tDT function which will become the interface through which the index is used, and it includes ADT function information entries 523 for an index access for the number of created indexes.

Each of the ADT function information entries 523 for an index access contains therein an index (id) showing which index the ADT function information 52c for an index access relates to, and an ADT function name which will be an interface.

Now, by setting a plurality of different ADT function names in correspondence to the index id showing the specific index a plurality of different ADT definition functions can hold both the specific user definition index 41 and the specific implementation module of the various kinds of modules 100a to 100d in common.

FIG. 6 shows an example of a structure of the module definition information 54 which is stored in the dictionary 5.

As shown in FIG. 6, the module definition information 54 which is stored in the dictionary 5 according to the present embodiment contains therein two kinds of information, i.e., index module definition information 54a and ADT module definition information 54b. The index module definition information 54a is definition information relating to the module used to implement the user-defined index 41, and ADT module definition information 54b is definition information relating to the module used to implement the user-defined data type (ADT).

The index module definition information 54a includes index module definition information entries 541 for the number of modules used to implement the user-defined index 41. Each of the index module definition information entries 541 contains therein a module name relating to the specified module used to implement an access to the user-defined index 41, an index type id, and a module calling trigger.

The index type id is an index type id showing which index type should be implemented. The module calling trigger represents a trigger when the relational module is executed in order to implement the user-defined index 41.

The ADT module definition information 54b includes ADT module definition information entries 542 for the number of modules used to implement the ADT. Each of the ADT module definition information entries 542 contains therein a module name relating to the specified module used to implement the behavior of the ADT, an ADT name, a module calling trigger, an executed ADT function name, and an index type id.

The ADT name represents a behavior of which ADT the relational module (recognized in the module name) is executed in order to implement, or the operation for which ADT that relational module is executed when have carried out.

The module calling trigger represents a trigger when the relational module is executed in order to implement the user-defined index 41. If a module calling trigger is provided for implementing the behavior of the ADT by the relational module, i.e., if the module calling trigger is provided for implementing the ADT function, which is clearly described in the query request (SQL statement) issued from an end user, by the relational module, then "AS_FUNCTION" is set in the module calling trigger along with the specification by an end user.

When "AS_FUNCTION" is set in the module calling trigger, the name of the ADT function for executing the module of interest is shown in the executed ADT function name.

When "AS_KEY_CREATION" is specified as the module calling trigger to the module definition information 3 from a registering user, "AS_KEY_CREATION" is set in the module calling trigger of the ADT module definition information 54b, and also the index type id showing an index of which index type the index key creation module is provided for, is set in the index type id.

In addition, by modifying not only the index type names and the index id's of the index type definition information 51 and the index definition information 52, but also the module name and the index id of the module definition information 54, the module which is executed for the specific ADT function name can be modified to modify the contents of the database processing.

Next, a description will hereinbelow be given with respect to the processing for the procedures to add and to create a new index shown in FIG. 3 with reference to flow charts shown in FIGS. 7 to 9.

FIG. 7 is a flow chart of a typical flow showing the processing procedure of processing the definition of an index type in the present embodiment.

As shown in FIG. 7, in the processing of the definition of an index type according to the present embodiment, there is shown an example of a typical flow of the processing of procedure 301 of the definition of an index type, which processing is executed by the definition processing unit 80. First of all, in Step 811, the index type id for recognizing the index type is determined for the index type name which has been inputted from a registering user to be assigned thereto.

Then, the index type information entries 511 (refer to FIG. 4) are created on the basis of the index type id thus determined and the user input information, and then they are registered in the dictionary 5 (step 812). In response to a request issued from the definition processing unit 80, the dictionary management unit 90 carries out the registration of the index type information entries 511 in the dictionary 5.

Next, likewise, the index key information entries 512 are created using the index type id to be registered in the dictionary 5 (Step 813).

In the example shown in FIG. 3, the index type "890" is, for example, assigned to the index type DOC-INDEX which has been specified by a registering user. In addition, since it is specified that the data type of the index key is VARCHAR alone, first of all, the index type information entry 511 as shown hereinbelow is created to be registered in the dictionary 5 as shown in FIG. 4.

Index name: DOC-INDEX

Index type id: 890

The number of index keys: 1

Since with respect to the index key information 51b, the specified length of the VARCHAR is 32,000 and the number of specifications of the index keys is one, the following index key information entry 512 in which the specified number is also one is created to be registered in the dictionary 5 as shown in FIG. 4.

Index type id: 890

Data type: VARCHAR

Defined length: 32,000

Specified number: 1

Figure 8:
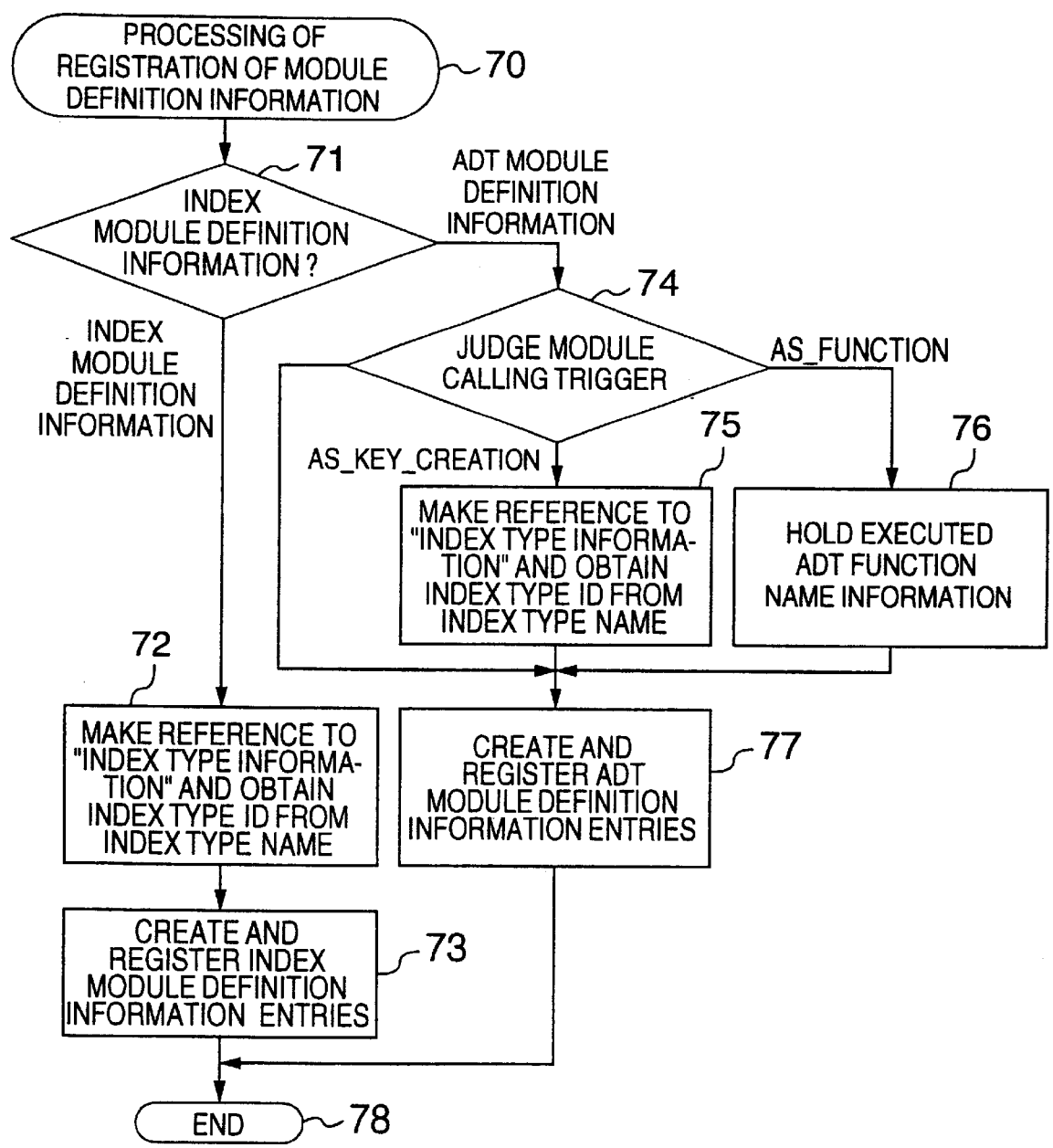
FIG. 8 is a flow chart of a typical flow showing the steps to register the module definition information according to an embodiment of the present invention.

FIG. 8 is a flow chart of a typical flow showing the processing procedure of processing the registration of module definition information in the present embodiment.

As shown in FIG. 8, in the processing of the registration of module definition information of the present embodiment, there is shown a typical flow of the processing in the module definition information registration unit 70 for implementing both procedure 302 of the registration of index implementation module definition information and procedure 304 of the registration of ADT implementation module definition information, which procedures 302 and 304 were previously described with reference to FIG. 3.

First of all, in Step 71, it is judged whether the module definition information 3 which has been inputted from a registering user who adds the user-defined index 41 is definition information of the index module or definition information of the ADT module.

Then, when it is judged in Step 71 that the inputted module definition information 3 is definition information of the index module, the processing proceeds to Step 72. Then, reference is made of the index type information 51a which is stored in the dictionary 5, and the index type id is obtained from the index type name which a registering user has specified on the basis of the module definition information 3.

Thereafter, the index module definition information entries 541 are created on the basis of that index type id and the user input information, and then they are registered in the dictionary 5 (Step 73), thereby completing the processing (Step 78).

On the other hand, when it is judged in Step 71 that the inputted module definition information 3 is the definition information of the ADT module, the processing proceeds to the module calling trigger judgment processing in Step 74. Then, it is judged whether the module trigger specification from a registering user is the "AS_FUNCTION" specification, "AS_KEY_CREATION" specification or another specification.

When it is judged in Step 74 that the module trigger specification from a registering user is the "AS_FUNCTION" specification, the name of the ADT function which is implemented by the module of interest is held in order to create the module definition information entries (Step 76), and then the processing proceeds to Step 77.

When it is judged in Step 74 that the module trigger specification from a registering user is the "AS_KEY_CREATION" specification, reference is made of the index type information 51a which is stored in the dictionary 6, and the index type id is obtained from the index type name which a registering user has specified on the basis of the module definition information 3 to be held (Step 75), and then the processing proceeds to Step 77.

On the other hand, when it is judged in Step 74 that the module trigger specification from a registering user is a specification other than the "AS_FUNCTION" specification or the "AS_KEY_CREATION" specification, the processing proceeds directly to Step 77.

In Step 77, the ADT module definition information entries 542 are created on the basis of the information which is previously held in Step 75 or Step 76, and then they are registered in the dictionary 5, thereby completing the processing (Step 78).

The ADT function name which is previously held in the executed ADT function name is set in the entry in which the module calling trigger is "AS_FUNCTION". In addition, the index type id which is previously held in the index type id is set in the entry in which the module calling trigger is "AS_KEY_CREATION". Then, the dictionary management unit 90 carries out a registration in the dictionary 5 for another.

Figure 9:
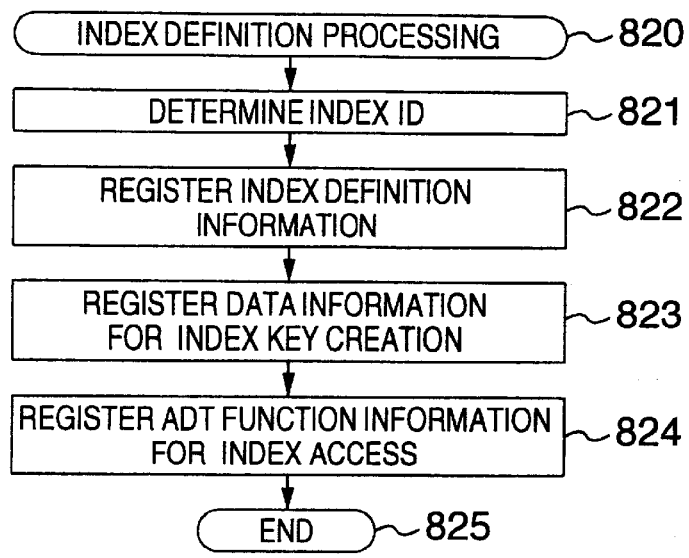
FIG. 9 is a flow chart of a typical flow showing the steps to build an index according to an embodiment of the present invention.

FIG. 9 is a flow chart of a typical flow showing the processing procedure of processing the definition of an index according to the present embodiment.

As shown in FIG. 9, in the processing of the definition of an index in the present embodiment, there is shown an example of a typical flow of the processing of the definition of an index (procedure 306) in the definition processing unit 80. First of all, in Step 821, the index id used to recognize the index is determined to be assigned to the index name which has been inputted from a registering user.

Then, the index definition information entries 521 are created on the basis of the index id of interest and the user input information, and then they are registered in the dictionary 5 (Step 822). In response to a request issued from the definition processing unit 80, the dictionary management unit 90 carries out the registration of the index definition information entries 521 in the dictionary 5.

Likewise, the data information entries 522 for index key creation are created on the basis of the information (user input information) for use in accessing the table data 42 which is required for creating the index id and the index, and then they are registered in the dictionary 5 (Step 823).

The data information entries 522 for index key creation are created for the number of data for key creation within each of the index definition information entries 521. Then, the order number of the data for index key creation which is described with the "CREATE INDEX statement" is set in the specified number within each of the entries.

Next, the ADT function information entries 523 for an index access are created using the specified ADT function name as the interface through which the index id and the index are used, and then they are registered in the dictionary 5 (Step 824), thereby completing the processing (Step 825).

The ADT function information entries 523 for an index access are also created for the number thereof which has been specified in the "CREATE INDEX statement". Incidentally, in the example shown in FIG. 3, the number of entries relating to the index DOC-INDEX is only one, containing the ADT function name "CONTAINS".

Figure 10:
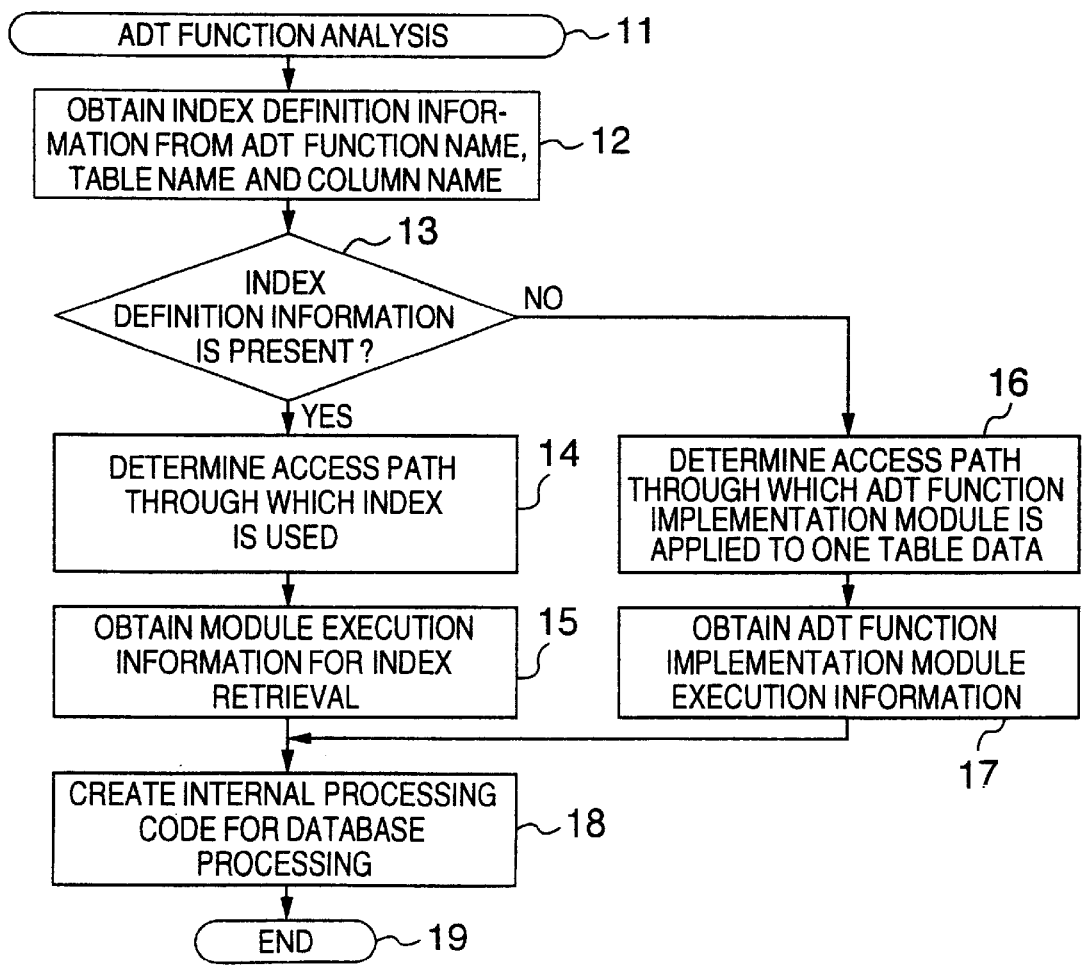
FIG. 10 is a flow chart of a typical flow showing the steps to analyze ADT functions in a query according to the embodiment of the present invention.

FIG. 10 is a flow chart of a typical flow showing the processing procedure of the ADT function analysis processing according to the present embodiment.

As shown in FIG. 10, in the ADT function analysis processing of the present embodiment, there is shown an example of a typical flow of the analysis processing relating to the ADT function when the ADT function comes out in the user requests (SQL statement) in the query analysis processing unit 10.

First of all, in Step 12, by using the ADT function name as an object of analysis, and the table name and the column name to which the ADT function of interest is applied, the ADT function information entries 523 for an index access, the index definition information entries 521 and the data information entries 522 for creating the relational index key, which entries 523, 521 and 522 are stored in the dictionary 5, are obtained.

Next, it is judged whether or not the relational entry is present in the dictionary 5, i.e., the obtained entry was present therein (Step 13). Then, when it is judged in Step 13 that the relational index definition information 52 is present in the dictionary 5, by using the index which is recognized on the basis of the index id of the obtained information, it is determined to use the access path used to implement the required ADT function (Step 14).

Next, in Step 15, the module execution information for an index retrieval is obtained, as the information used to access the index, the use of which has been determined, from the index module definition information 54a stored in the dictionary 5 using the index type id (in the associated index definition information entry 521).

Then, in Step 18, by using the index id of the index, the use of which has been determined, and the module information (module name) for use in implementation of the access to the index of interest, the internal processing code for an index access is created, thereby completing the processing (Step 19).

On the other hand, when it is judged in the judgement processing of Step 13 that the corresponding index definition information 52 is absent, no index is used, but the access path is determined through which the ADT function implementation module is executed for one table data to implement the ADT function (Step 16).

Then, in Step 17, the ADT function implementation module information is obtained using the ADT function name, and the internal processing code for the database processing is created using the information of interest (module name)(Step 18).

In accordance with the instruction of the created internal processing code for the database processing, in the database calculation processing unit 20, the user definition index management unit 30 executes the database processing in cooperation with the table data management unit 40.

Figure 11:
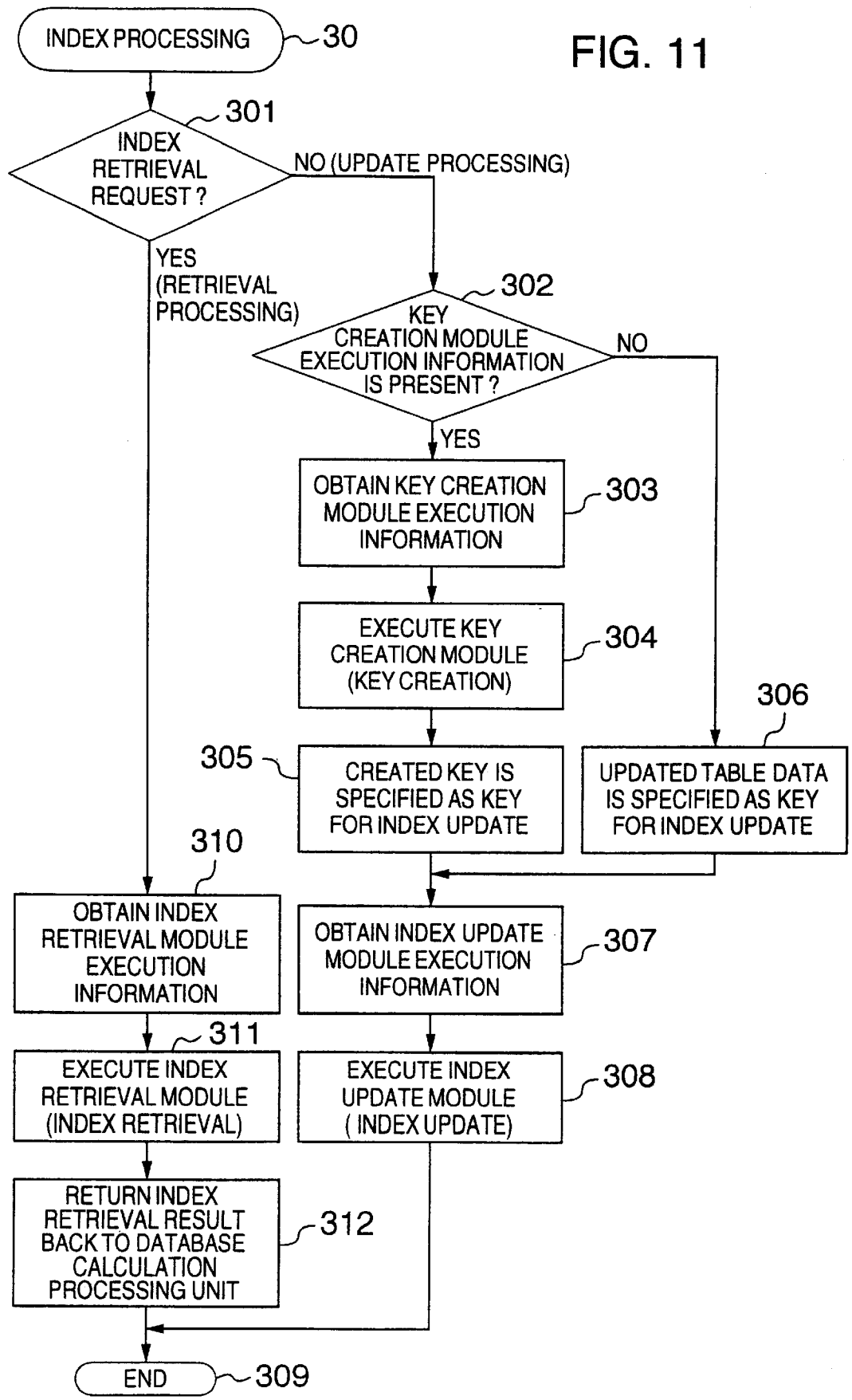
FIG. 11 is a flow chart of a typical flow showing the steps to access an index according to an embodiment of the present invention.

FIG. 11 is a flow chart of a typical flow showing the processing procedure of the index processing according to the present embodiment.

As shown in FIG. 11, in the index processing of the present embodiment, there is shown the processing in the user definition index management unit 30. More specifically, there is shown an example of the index processing in the user-defined index management unit 30 when receiving the request issued from the database calculation processing unit 20.

First of all, in Step 301, it is judged whether the processing request issued from an end user is the index retrieval request or the index update request. When it is judged in Step 301 that the processing request is the index retrieval request, the processing proceeds to Step 310, and then information for executing the module used to implement the index retrieval is obtained. Thereafter, the index retrieval module is executed on the basis of that information to carry out the index retrieval (Step 311). The result of retrieving the index is returned back to the database calculation processing unit 20 (Step 312), thereby completing the processing (Step 309).

On the other hand, when it is judged in Step 301 that the processing request is the update processing, the preparation of the data used to update the index is carried out as the preliminary preparation for the processing of updating the index. As for the input data for the processing of updating the index, there are the input data which is created using the key creation module which is specified in the ADT module definition information 54b by a registering user, and the input data to which the data, which has been obtained by making reference to the table data 42, is directly applied. Then, in Step 302, the judgment between the two kinds of input data is determined on the basis of whether or not the module definition information 54 for executing the key creation module is present in the dictionary 5.

When it is determined in Step 302 that the relational key creation module execution information is present in the dictionary 5, that information is obtained (Step 303), and then the key creation module is executed using that information thus obtained to create the key (Step 304). Then, the key thus created is specified as the input key for the index update (Step 305).

On the other hand, when it is determined in Step 302 that the relational key creation module execution information is absent in the dictionary 5, the data of the update table data is specified as the key for index update (Step 306).

Next, in Step 307, the information used to execute the index update module is obtained. Then, by using the above-mentioned specified key for index update, the index update module is executed to update the index (Step 308).

Next, under the structure previously described with reference to FIG. 1 and the definition of the database of FIG. 3 (adding of the user-defined index 41), the description will hereinbelow be given with respect to the database processing employing a user-defined index by using a concrete command example.

First of all, the description will now be given by taking the following update request (SQL statement) issued from an end user as an example.

INSERT INTO movies_lib
        VALUES ("independence day", 12, 1996,
           TEXT (8734, "ID4", "ID4", "Mr. X", text_v),
           contents_v)

In this connection, the ADT function TEXT is the function for creating the ADT data (instance), i.e., the constructor function and creates the TEXT type data with a text number (8734), a text name ("ID4"), an author ("Mr. X"), and the contents of the text (VARCHAR type data represented by a variable text_v) as arguments.

In the above-mentioned example of the SQL statement, there is shown the request of inserting into movies_lib table, the data having, as values, the BLOB (binary large objects) type data which is represented in the form of title (title): "independence day", country (production country code): 12, production_year (production year): 1996, guide (explanation): TEXT type data (created by the constructor function), and movie_contents (picture): variable contents_v. In addition, the code 12 which is specified in the country column is a code representing the production country U.S.A.

The maintenance of the user-defined index is carried out in the user-defined index management unit 30 in conjunction with insertion of the table data 42 in accordance with the flow chart shown in FIG. 11.

As shown in FIG. 5, since the index DOC-SEARCH is created in the index definition information 52*a* of movies_lib table, a processing of updating the index DOC-SEARCH is executed.

First of all, the contents attribute data in the guide column is prepared as the data for index key creation on the basis of the data information 52*b* for index key creation.

Then, the p_text_key_create module which is represented by the ADT module definition information 54*b* (refer to FIG. 6) is executed with the prepared data as an input to create the index key for use in update of DOC-SEARCH index. The index key thus created is the VARCHAR type data which is 32,000 in definition length.

Next, the module _p_doc_insert which is represented by the module calling trigger of AS_INDEX_INSERT in the index module definition information 54*a* is executed with the created index key as an input, thereby executing the index update processing (refer to FIG. 6).

Next, the description will hereinbelow be given by taking the retrieval request (SQL statement) issued from an end user as an example.

"SELECT title, movie_contents FROM movies_lib WHERE CONTAINS (guide, "independence")".

Now, the function CONTAINS is the function of returning TRUE (BOOLEAN type) in the case where the word which is specified by a second parameter is contained in the specified ADT data as a first parameter.

In the above-mentioned example of the SQL statement, there is shown the retrieval request of fetching title (title) and movie_contents (picture) of the table data in which "independence" is contained in the guide column (explanation) of movies_lib table.

In the query analysis processing unit 10, the implementation of the ADT function is determined by using the index DOC-SEARCH which is of a DOC-INDEX user-defined index type in accordance with the flow of the flow chart shown in FIG. 10.

Then, the index retrieval module _p_text_contents is executed so that the table data 42 is established as the retrieval result, and the values of title and movie_contents as the fetching column specified by the table data management unit 40 are returned as the query result back to an end user.

The processing of the flow chart which has hereinabove been shown is executed in the form of a program in the computer system 1000 which is given as an example.

However, such a program is not limited to the program stored in only the external memory 1003 which is physically, directly connected to the computer system 1000 as shown in FIG. 2. That is, such a program may be stored in a storage medium, from/to which it can be read out/written, such as a hard disk device, a floppy disk device, a cassette streamer, or a DAT which is not physically, directly connected to the computer system 1000. Of course, the form of a program which is stored from the external memory of the computer for implementing the present invention is also included in the present invention.

As set forth hereinabove, according to the database processing method and the system of the present invention, in the case where the user-defined function in processing request is the function which is defined in the index definition information, since the implementation module corresponding to the above-mentioned user-defined function is executed to carry out the index access, the general database processing can be executed independently of a specific user-defined function.

In addition, according to the database processing of the present embodiment, a plurality of different user definition functions are set in correspondence to the specific index by using the index definition information, whereby a plurality of different user-defined functions hold in common the implementation module by which the data of the database region is subjected to the specific processing. As a result, it is possible to make the implementation module for use in a specific index access independent of the user-defined function.

In addition, according to the database processing of the present embodiment, both the index definition and the module definition information are modified, whereby the implementation module which is set in correspondence to the specific user-defined function is modified. Therefore, it is possible to self-contain only the required implementation module.

Although the present invention has been specifically described with reference to the above-mentioned embodiments, it is to be understood that the present invention is not limited to the above-mentioned embodiments, and hence the various changes and modifications will occur to those skilled in the art without departing from the scope and true spirit of the present invention. The scope of the invention is therefore to be determined solely by the appended claims.

What is claimed is:

1. A database management method of performing a database processing by invoking a function registered in the database in response to a request of the processing, comprising the steps of:

relating an index type name with a data type of parameter into a first correspondence and cataloging the first correspondence as index type definition information, said index type name representing a type of a particular index that is built-in to a database system, and said data type of parameter transferring a routine managing an index of an index type identified by said index type name;

relating the index type name with data invoking a routine for searching the index of said index type in a second correspondence and cataloging the second correspondence as routine definition information;

relating an index name, an index type name of the index type in an index corresponding to said index name, column information included in a column of a table defining said index, and a function name identifying a function for accessing said index into a third correspondence and cataloging the third correspondence as index definition information;

upon receipt of said processing request including a name of a function and column information used by said function, referring to said index definition information to acquire a relevant one of said cataloged index type names corresponding to said function name and said column information when said function name and said column information match said cataloged function name and said cataloged column information, referring to said index type definition information to acquire the data type of said cataloged parameter corresponding to said acquired index type name, generating an execution plan based on said acquired index type name and said acquired data type of parameter; and in executing said execution plan, referring to said routine definition and invoking a routine for reference to an index corresponding to said acquired index type name based on a routine invoking data corresponding to said acquired index type name.

2. A database management system that performs a database processing by invoking a function registered in the database in response to a request of the processing, the system comprising:

means for relating an index type name with a data type of parameter into a first correspondence and cataloging the first correspondence as index type definition information, said index type name representing a type of a particular index that is built-in to a database system, and said data type of parameter transferring a routine managing an index of an index type identified by said index type name;

means for relating the index type name with data invoking a routine for searching the index of said index type in a second correspondence and cataloging the second correspondence as routine definition information;

means for relating an index name, an index type name of the index type in an index corresponding to said index name, column information included in a column of a table defining said index, and a function name identifying a function for accessing said index into a third correspondence and cataloging the third correspondence as index definition information;

means for, upon receipt of said processing request including a name of a function and column information used by said function, referring to said index definition information to acquire a relevant one of said cataloged index type names corresponding to said function name and said column information when said function name and said column information match said cataloged function name and said cataloged column information, referring to said index type definition information to acquire the data type of said cataloged parameter corresponding to said acquired index type name, and generating an execution plan based on said acquired index type name and said acquired data type of parameter; and means for, in executing said execution plan, referring to said routine definition and invoking a routine for reference to an index corresponding to said acquired index type name based on a routine invoking data corresponding to said acquired index type name.

3. A computer-implemented program which, when executed by a computer, causes the computer to implement a database management method comprising the steps of:

relating an index type name with a data type of parameter into a first correspondence and cataloging the first correspondence as index type definition information, said index type name representing a type of a particular index that is built-in to a database system, and said data type of parameter transferring a routine managing an index of an index type identified by said index type name;

relating the index type name with data invoking a routine for searching the index of said index type in a second correspondence and cataloging the second correspondence as routine definition information;

relating an index name, an index type name of the index type in an index corresponding to said index name, column information included in a column of a table defining said index, and a function name identifying a function for accessing said index into a third correspondence and cataloging the third correspondence as index definition information;

upon receipt of said processing request including a name of a function and column information used by said function, referring to said index definition information to acquire a relevant one of said cataloged index type names corresponding to said function name and said column information when said function name and said column information match said cataloged function name and said cataloged column information, referring to said index type definition information to acquire the data type of said cataloged parameter corresponding to said acquired index type name, generating an execution plan based on said acquired index type name and said acquired data type of parameter; and in executing said execution plan, referring to said routine definition and invoking a routine for reference to an index corresponding to said acquired index type name based on a routine invoking data corresponding to said acquired index type name.

4. A database management method of performing a database processing by invoking a function registered in the database in response to a request of the processing, comprising the steps of:

relating an index type name with a data type of parameter into a first correspondence and cataloging the first correspondence as index type definition information, said index type name representing a type of a particular index that is built-in to a database system, and said data type of parameter transferring a routine managing an index of an index type identified by said index type name;

relating the index type name with data invoking a routine for searching the index of said index type in a second correspondence and cataloging the second correspondence as routine definition information;

relating an index name, an index type name of the index type in an index corresponding to said index name, column information included in a column of a table defining said index, and a function name identifying a function for accessing said index into a third correspondence and cataloging the third correspondence as index definition information;

upon receipt of said processing request including a name of a function and column information used by said function, referring to said index definition information to acquire a relevant one of said cataloged index type names corresponding to said function name and said column information when said function name and said column information match said cataloged function name and said cataloged column information, referring to said routine definition information to acquire a relevant one of said cataloged routine invoking data corresponding to said acquired index type name, generating an execution plan based on said acquired routine invoking data; and in executing said execution plan for execution of a routine corresponding to said acquired routine invoking data, invoking said routine based on the routine invoking data.

5. A database management system that performs a database processing by invoking a function registered in the database in response to a request of the processing, the system comprising:

means for relating an index type name with a data type of parameter into a first correspondence and cataloging the first correspondence as index type definition information, said index type name representing a type of a particular index that is built-in to a database system, and said data type of parameter transferring a routine managing an index of an index type identified by said index type name;

means for relating the index type name with data invoking a routine for searching the index of said index type in a second correspondence and cataloging the second correspondence as routine definition information;

means for relating an index name, an index type name of the index type in an index corresponding to said index name, column information included in a column of a table defining said index, and a function name identifying a function for accessing said index into a third correspondence and cataloging the third correspondence as index definition information;

means for, upon receipt of said processing request including a name of a function and column information used by said function, referring to said index definition information to acquire a relevant one of said cataloged index type names corresponding to said function name and said column information when said function name and said column information match said cataloged function name and said cataloged column information, referring to said routine definition information to acquire a relevant one of said cataloged routine invoking data corresponding to said acquired index type name, and generating an execution plan based on said acquired routine invoking data; and means for, in executing said execution plan for execution of a routine corresponding to said acquired routine invoking data, invoking said routine based on the routine invoking data.

6. A computer-implemented program which, when executed by a computer, causes the computer to implement a database management method comprising the steps of:

relating an index type name with a data type of parameter into a first correspondence and cataloging the first correspondence as index type definition information, said index type name representing a type of a particular index that is built-in to a database system, and said data type of parameter transferring a routine managing an index of an index type identified by said index type name;

relating the index type name with data invoking a routine for searching the index of said index type in a second correspondence and cataloging the second correspondence as routine definition information;

relating an index name, an index type name of the index type in an index corresponding to said index name, column information included in a column of a table defining said index, and a function name identifying a function for accessing said index into a third correspondence and cataloging the third correspondence as index definition information;

upon receipt of said processing request including a name of a function and column information used by said function, referring to said index definition information to acquire a relevant one of said cataloged index type names corresponding to said function name and said column information when said function name and said column information match said cataloged function name and said cataloged column information, referring to said routine definition information to acquire a relevant one of said cataloged routine invoking data corresponding to said acquired index type name, generating an execution plan based on said acquired routine invoking data; and in executing said execution plan for execution of a routine corresponding to said acquired routine invoking data, invoking said routine based on the routine invoking data.

* * * * *